United States Patent Office 3,287,341
Patented Nov. 22, 1966

3,287,341
PROCESS FOR POLYMERIZING PROPYLENE
Joseph H. Tazewell, Akron, and Robert J. Reid, Canal Fulton, Ohio, assignors to The Firestone Tire & Rubber Company, Akron, Ohio, a corporation of Ohio
No Drawing. Filed Aug. 6, 1962, Ser. No. 214,822
2 Claims. (Cl. 260—93.7)

This invention relates to a process for the polymerization of propylene, and to high polymers of propylene with improved properties resulting from said process.

There has recently been developed a process for the polymerization of propylene in which the monomer is brought into contact with a catalyst produced by mixing together (A) sodium metal
(B) an aluminum-reduced, activated preparation of titanium tetrachloride, hereinafter referred to, for convenience as titanium chloride
(C) tetrakis(dimethylamino)silane, hereinafter referred to as TDSI This catalyst gives a reasonably good product but as will be seen, the properties particularly hardness and rigidity can still be improved by utilizing the present invention.

It is therefore an object of this invention to modify the above-referred-to polymerization process so as to produce polypropylene of novel structure having improved physical properties.

Another object is to produce novel polypropylene having enhanced surface hardness and rigidity as compared to commercial polymers heretofore.

The above and other objects are secured, in accordance with this invention, by polymerizing propylene by contacting it with the catalyst referred to above, namely the product of mixing together:

(A) sodium metal
(B) titanium chloride and
(C) TDSI and using with this catalyst a polymer-structure-modifier comprising an organozinc compound, specifically diethyl zinc.

The polypropylene produced by the present invention has enhanced physical properties, notably, greater hardness and elastic modulus than has heretofore been achieved in such polymers by using the above catalyst or by the use of other commercial catalysts.

Insofar as the sodium metal ingredient is concerned, the commercially available products are satisfactory. The sodium should preferably be supplied in a finely divided form, as for instance in the form of a dispersion in a liquid hydrocarbon.

Insofar as the titanium chloride ingredient is concerned, satisfactory results are obtained by using the product prepared by heating metallic aluminum with titanium tetrachloride at moderately elevated temperatures on the order of 90° C. in approximately the mol ratio of 3 mols of titanium tetrachloride to 1 gram-atom of aluminum metal. The reaction product has the empirical formula $Ti_3AlCl_{12}$, and appears to be a true compound of all of these elements, since any excess of titanium tetrachloride may be leached therefrom down to, but not beyond, the composition of the formula given.

The simple reaction product prepared as just described should preferably be subjected to an "activation" process, after which it is known as an "activated" preparation and is suitable for use in this invention. For example an "activated" product is prepared by subjecting the $Ti_3AlCl_{12}$ to intensive grinding as in a ball mill, edge runner, roll mill, disc mill, impact mill or the like. In general the extent of the grinding should be such that the power consumed in the process will amount to about 3–100 kilowatt hours per gram of material. This grinding not only serves to reduce the particle size, but also seems to develop certain catalytically active, strained crystal defect areas in the material, as the crystalline X-ray diffraction pattern changes progressively during the grinding.

An activated $Ti_2AlCl_{12}$ which has proven satisfactory is that which is sold commercially by the Stauffer Chemical Corporation under the trade designation "AA."

The TDSI ingredient referred to above is tetrakis(dimethylamino)silane of the formula

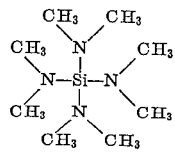

The catalyst used in this invention is prepared by mixing and agitating together (A) the sodium metal reducing agent plus (B) the titanium chloride plus (C) the TDSI, preferably in heptane or the like. These ingredients may be combined simultaneously or in any order: thus in some cases it may be desirable to pre-react two of the catalyst components before adding the other component. Temperature of mixing may vary within wide limits, usually between −10° C. or lower, say down to −100° C. up to temperatures on the order of 150° C. Preferably the temperature will be in the range 20° C. to 100° C. These temperature ranges apply also to the polymerization reaction proper. As to the relative proportions of the ingredients, a sufficient amount of the sodium metal will be used in order to effect the extent of reduction required to impart full catalytic activity. When the sodium is used in at least 1:1 mol ratio relative to the titanium compound, examination of the catalyst reveals the presence of free sodium metal, indicating that all of the reduction necessary for catalytic activity has been supplied by such amount of sodium. The upper limit of the sodium content is not critical, and is set mainly by economic considerations of cost of supplying unnecessary reducing agent. As indicated above it has been found satisfactory to operate in the range of 1.0 or more mols of the sodium per mol of titanium chloride.

As to the amount of TDSI to be used, vary small amounts, in the range 0.01 to 10 gram-atoms of amino nitrogen in the alkylaminated silicon compound per mol of sodium metal will suffice. The preferred amount is 0.1 but it will be appreciated that the upper limit will be imposed by economic considerations of supplying unneeded compound, rather than any technical considerations. Usually, no more of the hydrocarbonaminated compound will be used than will be sufficient to provide 10 gram-atoms of amino nitrogen per mol of reducing agent. The catalysts used in the invention may be prepared either in the presence or absence of the propylene, but preferably the catalyst ingredients are brought together in the presence of a substantial proportion, say 10% or more, of the propylene to be polymerized, as the most active catalysts are obtained in this manner.

The polymer-structure-modifier is zinc diethyl or some other suitable organozinc compound such as di-n-propyl zinc, di-n-butyl zinc, ethyl n-propyl zinc, di-(2-ethyl hexyl) zinc and the like. In accordance with this invention it is recommended that in the case of zinc diethyl, it be used in relatively small amounts, about .005 to .075 mol per mol of the titanium chloride in the catalyst. It should be noted that if the diethyl zinc is introduced into the system, in the amounts recommended above, and the catalyst ingredients, omitting the sodium, are added and the mixture allowed to react, the resultant product is almost totally ineffective in polymerizing propylene. It seems quite clear therefore that the diethyl zinc has no catalytic function but operates primarily, but quite effectively, as a modifier of the polymer structure which is produced by the present catalyst.

It should also be noted that while larger proportions of the zinc compound than those recommended herein may be used, for example, .075 to .125 mol or even more per mol of the titanium compound, according to the present invention, the extra amount of zinc compound over the recommended range seems to perform no function and is accordingly not strictly necessary to the practice of the present invention. The use (and consumption) of excess zinc compound merely adds to the cost without realizing any advantage therefrom. To repeat, it amounts of zinc compound in excess of the recommended range should be used, the extra amounts would be non-functional, performing no useful purpose and resulting in no harm except as incurring waste of the excess material as noted above.

THE POLYMERIZATION OPERATION

The polymerization is carried out by contacting monomeric propylene with the catalyst in the presence of the polymer-structure-modifier, in an inert organic liquid vehicle such as heptane. The catalyst will either have been previously prepared in a separate operation, or will be prepared in situ in the polymerization vessel, this latter method being especially convenient where the catalyst is prepared in the presence of the monomer; in such case the vehicle and monomer are charged to the polymerization vessel first, and the catalyst ingredients are charged and agitated together to form the catalyst. The polymer-strurture-modifier comprising a suitable organozinc compound such as di-ethyl zinc is then added, and the contents of the vessel adjusted to polymerization temperature if this is to be different from the charging temperature.

Desirably also, hydrogen may be incorporated in the polymerization mass, for instance in amounts of .0001–.05 mol per mol of monomer in order to regulate the molecular weight of the polymer.

The polymerization temperature may vary within wide limits, usually between —10° C. or lower, say down to —100° C., up to temperatures on the order of 150° C. Preferably the temperature will be in the range 20° C. to 100° C. The mass is usually agitated sufficiently to insure contact of the reactants with each other and to avoid premature segregation of the product. The amount of vehicle used should preferably be sufficient to avoid difficulty in agitation during the reaction, i.e., so that the concentration of the final polymer will be not over about 50%, based on the total weight of polymer and vehicle. The amount of catalyst should be such that it will reach economic exhaustion at the same time that the vehicle contains all of the polymer it can carry without difficulty in agitation. Ordinarily it will be expected that each gram of catalyst will produce from 15 to 100 grams of polymer. The polymerization may be carried out batchwise, or in a continuous manner wherein the catalyst (or ingredients thereof), vehicle and monomer are continuously discharged from the reactor system. The polymeric products are purified by any suitable treatment, as by contacting and washing with water, steam, alcohols, acids, ammonia, sodium hydroxide, sequestering agents such as ethanolamine, citric acid, ethylene diamine tetraacetic acid and the like.

The polypropylene of this invention is characterized by much greater hardness and stiffness than corresponding polymers produced in the art. For example, with specimens prepared by a given molding cycle, the harder types of polypropylene resins commercially available will show a Rockwell M hardness on the order of 40–50 or Rockwell R hardness on the order of 96–100. Under optimum conditions, the polypropylenes of this invention will have Rockwell hardnesses on the order of 56 or better on the M scale, or 105 or better on the R scale. Likewise the resins of this invention will in many instances show bending moduli in excess of 240,000 p.s.i. and in some cases in excess of 300,000 p.s.i., which cannot be attained in conventional polymers. Comparisons are of course to be made with identical molding cycles; the above figures and those in the example below, except where some other molding cycle is indicated, are on the basis of a molding cycle in which the test samples are compression-molded at a temperature of 185° C., and thereafter annealed at 125° C. for 2 hours. The figures of course will be changed but will maintain their qualitative differences, with other molding cycles.

With the foregoing general discussion in mind, there are given herewith detailed examples of the practice of this invention. All parts and percentages are given on the basis of weight, unless the contrary is specifically indicated.

Example I

| | |
|---|---|
| Heptane | 500 ml. |
| Hydrogen | 100 ml. |
| Propylene | 50 grams. |
| "AA"[1] suspension (1 molar, in mineral oil) | 4 ml. (.004 mol). |
| Metallic sodium suspension (1 molar, in mineral oil) | 4.5 ml. (.0045 mol). |
| Tetrakis(dimethylamino)silane solution (1 molar, in Shell Oil Co. commercial heptane) | 1.0 ml. (.001 mol). |
| Diethyl zinc solution (0.1 molar, in Shell Oil Co. commercial heptane) | 0 or 0.5 ml. (0 or .00005 mol). |

[1] The term "AA" is used here and in subsequent recipes to denote an aluminum-reduced, activated product of titanium tetrachloride having a composition corresponding to the formula Ti$_3$AlCl$_{12}$ and marketed under the designation "AA" by Stauffer Chemical Corporation. Mols of this material will be calculated on the basis of the formula Ti$_3$AlCl$_{12}$.

Two runs were made in accordance with the foregoing schedule, one with and one without the diethyl zinc. In each run the heptane was charged into a 28-ounce beverage bottle, which was then flushed with nitrogen and sealed with a butadiene-acrylonitrile rubber-lined crown cap provided with a perforation for the hypodermic injection of reactants. The hydrogen was injected by means of a volumetric hypodermic syringe, after which the bottle was placed upon a cradle on a balance which was brought to equilibrium and then overweighted with a 50-gram weight. Propylene was then injected through a conduit and hypodermic needle until the balance again came to equilibrium. The "AA," metallic sodium, tetrakis(dimethylamino)silane and diethyl zinc, in the proportions chosen for the run, were next hypodermically injected in the order named, and the bottle placed upon a polymerizer wheel which dipped and revolved the bottle in a water bath at 50° C. for 17 hours. The bottle was then vented, cooled, and opened, and the contents dumped into an equal volume of methanol. The resultant slurry was filtered, and the cake air-dried to yield the polymeric product. The resin was then compression molded into test specimens at 185° C., followed by annealing at 125° C. for two hours. In the run where no diethyl zinc was used, the Rockwell R hardness was 96; in the run using diethyl zinc, the Rockwell R hardness was 108.

Example II

| | |
|---|---|
| Heptane | 500 ml. |
| Hydrogen | 100 ml. |
| Propylene | 50 grams |
| "AA" suspension (1 molar, in mineral oil) | 4 ml. (.004 mol). |
| Metallic sodium suspension (1 molar, in mineral oil) | 3–6 ml. (.003–.006 mol per Table I). |
| Tetrakis(dimethylamino) silane solution (1 molar in Shell Oil Co. commercial heptane) | 0.5–1.0 ml. (.0005–.001 mol, per Table I). |
| Diethyl zinc solution (0.1 molar, in Shell Oil Co. commercial heptane) | 0.25–2.0 ml. (.000025–.0002 mol, per Table I). |

A series of runs was made in accordance with the foregoing schedule, varying the ingredients from run to run as set forth hereinafter in Table I. In each run the heptane was charged into a 28-ounce beverage bottle, which was then flushed with nitrogen and sealed with a butadiene-acrylonitrile rubber-lined crown cap provided with a perforation for the hypodermic injection of reactants. The hydrogen was injected by means of a volumetric hypodermic syringe, after which the bottle was placed upon a cradle on a balance which was brought to equilibrium and then overweighted with a 50-gram weight. Propylene was then injected through a conduit and hypodermic needle until the balance again came to equilibrium. At this point, the pressure in the bottle was about 40 p.s.i.g. The "AA" metallic sodium, tetrakis (dimethylamino) silane and lastly diethyl zinc, in the proportions chosen for the run, were next hypodermically injected in the order named, and the bottle placed upon a polymerizer wheel which dipped and revolved the bottle in a water bath at 50° C. for 17 hours. The bottle was then vented, cooled, and opened, and the contents dumped into an equal volume of methanol. The resultant slurry was filtered, and the cake air-dried to yield a polypropylene product. The physical properties of molded specimens and melt index of the product were determined.

Plasticity was determined by placing a 0.5 gram-sample between aluminum foil sheets and pressing it in a laboratory press heated to 250° C. under a load of 2500 lbs.: plasticity is expressed as the area, in sq. mm., of the resultant plaque. Set forth herewith in Table I are particulars of the several runs. From the table it will be seen that the present invention makes possible the production, in good yield, of polymers characterized by high modulus and hardness. Comparing optima, typical commercial products available to date have flexural modulus on the order of 150,000–220,000 p.s.i., Rockwell M hardness on the order of 40–50 and Rockwell R hardness on the order of 85–100; compare these with the figures for the runs in Table I.

TABLE I

| Catalyst Ingredients (millimols) | | | | Properties of Product | | | | | Run No. |
|---|---|---|---|---|---|---|---|---|---|
| Na | Titanium Compound $Ti_3AlCl_{12}$ | TDSI | Polymer-Structure-Modifier $ZnEt_2$ [1] (millimols) | Bending Modulus p.s.i. | Rockwell Hardness, Scale | | Melt Index at 250° C. | Plasticity 250° C. mm.[2] | |
| | | | | | R | M | | | |
| 6.0 | 4 | 1.0 | 0.05 | 245,000 | 107 | 51 | 1.96 | | 1 |
| 6.0 | 4 | 1.0 | 0.2 | 238,000 | 108 | | 7.03 | | 2 |
| 4.5 | 4 | 0.5 | 0.05 | 259,000 | 110 | 57 | 1.83 | | 3 |
| 4.5 | 4 | 0.75 | 0.05 | 227,000 | 107 | 54 | 1.37 | | 4 |
| 4.5 | 4 | 1.0 | 0.05 | 291,000 | 109 | 57 | 0.67 | | 5 |
| 4.5 | 4 | 0.5 | 0.2 | 263,000 | 113 | 68 | 4.21 | 5,850 | 6 |
| 6.0 | 4 | 0.75 | 0.2 | 239,000 | 112 | 65 | 2.03 | 5,200 | 7 |
| 4.5 | 4 | 0.75 | 0.2 | 262,000 | 113 | 68 | 3.03 | 6,000 | 8 |
| 6.0 | 4 | 1.0 | 0.2 | 261,000 | 114 | 68 | 2.53 | 5,750 | 9 |
| 4.5 | 4 | 1.0 | 0.2 | 222,000 | 112 | 63 | 8.63 | 5,840 | 10 |
| 6.0 | 4 | 1.5 | 0.2 | 264,000 | 114 | 70 | 4.93 | 6,250 | 11 |
| 4.5 | 4 | 1.5 | 0.2 | 322,000 | 115 | 72 | 4.08 | 5,470 | 12 |

[1] Diethyl zinc.

Example III

COMPARISON WITH COMMERCIAL RESINS

A resin prepared in accordance with this invention, together with samples of commercial resins, were compression molded at 175–177° C. into test specimens, and annealed at 125° C. for 2 hours. The hardness of each of the samples was determined and is tabulated herewith. The polymerization recipe for the resin of this invention contained 100 ml. of hydrogen per 50 grams of propylene.

TABLE II

| | Resin | | | | Rockwell Hardness | | Modulus (p.s.i.) |
|---|---|---|---|---|---|---|---|
| Origin | Catalyst Components (mols./100 g. of propylene) | | | Mols $ZnEt_2$ per 100 g. $C_3H_6$ | M | R | |
| | Na | TDSI | AA | | | | |
| This invention | 4.5 | 1.5 | 4.0 | .20 | 72 | 115 | 322,000 |
| Commercial: | | | | | | | |
| A | | | | | 54 | 107 | 238,000 |
| Polypropylene Resins: | | | | | | | |
| B | | | | | 45 | 100 | 168,000 |
| C | | | | | 48 | 108 | 224,000 |
| D | | | | | 46 | 100 | 184,000 |

It will be noted that the general level of hardness and modulus, both of the resins of this invention and of the commercial resins, are somewhat higher than values set forth in Examples I and II. This is because of the lower molding temperature used in this example, which affects these properties in this manner. However the relative relation is unchanged, in that the polypropylene of this invention is harder and has higher modulus than the commercial polypropylenes. It should be mentioned in passing that the commercial polypropylene resins A, B, C and D are the hardest grades of polypropylene resins offered by the respective manufacturers thereof.

Example IV

Heptane, 248 lbs.
Propylene, 100 lbs.
Metallic sodium suspension (30%, in mineral oil), q.s. to contain .206 lb. Na.
Tetrakis (dimethylamino)silane solution (1 molar, in heptane), q.s. to contain .412 lb. TDSI.
"AA" suspension (1 molar, in mineral oil), q.s. to contain 1.6 lb. "AA."
Diethyl zinc solution (1 molar, in heptane), q.s. to contain .012 lb. ZnEt$_2$.
Hydrogen, 14.7 cu. ft. at 25° C. atmospheric pressure.

The above ingredients provide the catalyst ingredients in the mol ratio sodium/TDSI/AA of 4.5/1.0/4.0. The mol ratio of diethyl zinc to AA is 0.0125. A 75-gallon stainless steel autoclave provided with a rotary anchor stirrer, a heating and cooling jacket, charging lines, and a lock for introduction of minor ingredients was used in this run. The heptane was charged first, and a vacuum pulled in order to purge the free space in the vessel. Stirring was commenced and continued throughout the run to follow, and propylene charged up to a pressure of 60 p.s.i.g. Thereafter the other ingredients were charged through the lock, and the temperature raised to 104° F. The reaction was continued for 18 hours, with re-pressuring of propylene whenever the pressure dropped below 60 p.s.i.g. At the end of this time, the excess propylene was vented and the slurry dropped from the autoclave and filtered to recover the polymer. There were recovered 86 pounds of a polypropylene resin. Test specimens of this resin injection molded at 260° C. had a Rockwell R hardness of 108 and a bending modulus of 328,000 p.s.i. A similar specimen of commercial resin molded in the same cycle had a Rockwell R hardness of 100 and a bending modulus of 193,000.

From the foregoing general description and detailed specific experimental data, it will be evident that this invention provides a novel process for the rapid and efficient polymerization of propylene. The polypropylene products are characterized by exceptional regularity of structure, and by superior physical properties, particularly hardness and bending modulus.

What is claimed is:
1. Process of polymerizing propylene monomer which comprises contacting said monomer with a catalyst produced by mixing together
   Metallic sodium
plus
   A titanium chloride which is an intensively ground reaction product of titanium tetrachloride and aluminum metal in the mole ratio of 3 mols of titanium tetrachloride to 1 gram-atom of aluminum, said reaction product having the formula Ti$_3$AlCl$_{12}$
plus
   Tetrakis-(dimethylamino)silane,
the polymerization taking place in the presence of hydrogen and in the presence of a polymer-structure-modifier comprising
   An alkyl zinc compound in which the alkyl groups contain up to 8 carbon atoms
said sodium being employed to the extent of at least 1.0 mol of the sodium per mol of said titanium chloride, said tetrakis-(dimethylamino) silane being used to an extent sufficient to provide from 0.01 to 10 gram-atoms of amino nitrogen per mol of sodium metal, said hydrogen being supplied to the extent of .0001 to .05 mol per mol of propylene and said alkyl zinc being suplied to the extent of from .005 to .075 mol per mol of said titanium chloride.

2. Process according to claim 1, wherein the alkyl zinc is diethyl zinc.

References Cited by the Examiner

UNITED STATES PATENTS

| | | | |
|---|---|---|---|
| 2,932,633 | 4/1960 | Juveland et al. | 260—94.95 |
| 2,971,925 | 2/1961 | Winkler et al. | 260—94.93 |
| 3,081,287 | 3/1963 | Coover | 260—94.93 |
| 3,196,137 | 7/1965 | Cain | 260—93.7 |

OTHER REFERENCES

Kresser, Polypropylene, Reinhold Publishing Corp., N.Y. (p. 48 relied on).

JOSEPH L. SCHOFER, *Primary Examiner.*

M. B. KURTZMAN, *Assistant Examiner.*

PO-1050
(5/69)

UNITED STATES PATENT OFFICE
CERTIFICATE OF CORRECTION

Patent No. 3,287,341      Dated November 22, 1966

Inventor(s) Joseph H. Tazewell and Robert J. Reid

It is certified that error appears in the above-identified patent and that said Letters Patent are hereby corrected as shown below:

Column 2, line 5

"$Ti_2AlCl_{12}$" should read -- $Ti_3AlCl_{12}$ --

Column 3, line 31 ff

"polymer-strurture" should read -- polymer-structure --

Column 4, line 4

"example" should read -- Examples --

Example IV in the patent left out the heading -- LARGE SCALE PREPARATION -- (this is shown in our application on page 16)

SIGNED AND
SEALED
MAR 17 1970

(SEAL)
Attest:

Edward M. Fletcher, Jr.
Attesting Officer

WILLIAM E. SCHUYLER, JR.
Commissioner of Patents